(12) United States Patent
Asami

(10) Patent No.: US 8,720,779 B2
(45) Date of Patent: May 13, 2014

(54) METHOD OF READING PATTERN IMAGE, APPARATUS FOR READING PATTERN IMAGE, INFORMATION PROCESSING METHOD, AND PROGRAM FOR READING PATTERN IMAGE

(75) Inventor: Satoshi Asami, Chiba (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 712 days.

(21) Appl. No.: 12/616,838

(22) Filed: Nov. 12, 2009

(65) Prior Publication Data

US 2010/0116888 A1    May 13, 2010

(30) Foreign Application Priority Data

Nov. 13, 2008   (JP) ................................ P2008-290431

(51) Int. Cl.
   *G06K 7/10*          (2006.01)
(52) U.S. Cl.
   USPC ....... 235/454; 235/375; 235/462.01; 235/487
(58) Field of Classification Search
   USPC ............ 235/454, 462, 472, 375, 462.01, 487; 40/360
   See application file for complete search history.

(56) References Cited

U.S. PATENT DOCUMENTS

2006/0007189 A1 *  1/2006  Gaines et al. ................. 345/179
2006/0071076 A1 *  4/2006  Tamayama .................... 235/454
2007/0023523 A1 *  2/2007  Onishi .......................... 235/454

FOREIGN PATENT DOCUMENTS

JP      2004-78351       3/2004
JP      2005-182629      7/2005
JP      2007 156969      6/2007

* cited by examiner

*Primary Examiner* — Michael G Lee
*Assistant Examiner* — Tabitha Chedekel
(74) *Attorney, Agent, or Firm* — Frommer Lawrence & Haug LLP; William S. Frommer

(57) ABSTRACT

Disclosed is a method of capturing and reading a pattern image having three or more pages generated from predetermined information using a capturing section provided in a reading apparatus. The pattern image is configured such that each page includes relevant page information indicating a position of the relevant page and the pages are displayed on a display screen sequentially and successively at a time interval and cyclically and repetitively. The method includes a step of, when two pages of the pattern image have been read, causing the reading apparatus to predict a capturing timing by the capturing section for each remaining unread page from a capturing time interval between the two pages and the relevant page information of each of the two pages, and to perform control such that each remaining unread page of the pattern image is captured and read by the capturing section with the predicted capturing timing.

10 Claims, 7 Drawing Sheets

FIRST PAGE

SECOND PAGE

|  | PHOTOGRAPHING TIME (ms) | PHOTOGRAPHED PAGE |
|---|---|---|
| FIRST SHEET PHOTOGRAPHING | 200 | PAGE 2 |
| SECOND SHEET PHOTOGRAPHING | 400 | PAGE 4 |

|  | PHOTOGRAPHING TIME (ms) | PAGE TO BE PHOTOGRAPHED |
|---|---|---|
| FIRST SHEET PHOTOGRAPHING | 200 | PAGE 2 (PHOTOGRAPHED) |
| SECOND SHEET PHOTOGRAPHING | 400 | PAGE 4 (PHOTOGRAPHED) |
| THIRD SHEET PHOTOGRAPHING | 500 (PREDICTED) | PAGE 5 |
| FOURTH SHEET PHOTOGRAPHING | 600 (PREDICTED) | PAGE 1 |
| FIFTH SHEET PHOTOGRAPHING | 800 (PREDICTED) | PAGE 3 |

METHOD OF READING PATTERN IMAGE, APPARATUS FOR READING PATTERN IMAGE, INFORMATION PROCESSING METHOD, AND PROGRAM FOR READING PATTERN IMAGE

BACKGROUND OF THE INVENTION

1. Field of the Invention

The present invention relates to a method and apparatus for reading a pattern image, such as a two-dimensional barcode pattern image or the like, and a program for reading a pattern image.

2. Description of the Related Art

In recent years, barcodes have come into wide use in the fields of distribution, manufacturing, logistics, service, and the like. Two-dimensional barcodes, such as QR Code® and the like, which are obtained by two-dimensionally expanding a one-dimensional barcode (bars are arranged in only one direction) also increasingly spread.

Advancement of an optical reading apparatus stimulates the appearance of the standard with a high recording density. Though depending on the standard, the one-dimensional barcode can express around 20 alphanumeric characters. In recent years, the standard regarding a two-dimensional barcode capable of storing information of more than 2000 characters has appeared.

Most mobile phone terminals which have rapidly spread have a camera mounted therein. An application has also come into use which can automatically acquire a mail address or the URL (Uniform Resource Locator) of a Web site when a two-dimensional barcode displayed on an advertising medium is photographed by the camera of the mobile phone terminal.

The barcodes are not all displayed on paper mediums. The pattern image of a barcode posted on a Web page may be displayed on a display screen and captured by the camera of the mobile phone terminal so as to acquire URL information.

While a communication apparatus, such as a mobile phone terminal or the like, can simply acquire information from, for example, an advertising medium or the like by using a barcode, unlike typical data communication, the amount of information is limited due to the optical limitation. At present, character information of not more than about 2000 characters can be presented. This is because, even though the recording density of the barcode patterns simply increases, the camera mounted in a communication apparatus, such as a mobile phone terminal or the like, has a limited resolution, so the amount of information to be imported is limited.

As described above, according to the related art, information can be easily presented by the barcode, but the limited amount of information can merely be presented.

A method of increasing the amount of information to be presented by a barcode is described in Japanese Unexamined Patent Application Publication No. 2007-156969. The barcode presentation method described in Japanese Unexamined Patent Application Publication No. 2007-156969 is applied to the pattern image of a barcode displayed on a display screen. According to this method, the pattern image of the barcode is not displayed in the form of a still image, but the pattern image of the barcode is configured such that multiple sheets (multiple pages) are displayed and presented successively in a temporal direction, like a motion image.

According to the method described in Japanese Unexamined Patent Application Publication No. 2007-156969, information can be presented by a barcode pattern group having multiple pages and therefore a large amount of information can be presented.

SUMMARY OF THE INVENTION

As described in Japanese Unexamined Patent Application Publication No. 2007-156969, the pattern image of a barcode having multiple pages is captured and read by the camera, it is preferable that the multiple pages are read rapidly in a short time. That is, it is important to rapidly photograph and import each of the multiple pages and to decode barcode information.

According to the method described in Japanese Unexamined Patent Application Publication No. 2007-156969, two different types of synchronization information are prepared and respectively added to the barcode patterns of adjacent pages. Then, each of the multiple pages which are successively presented is captured more than once, for example, four sheets are obtained, and stored. The pages to which the same synchronization information is successively added are determined as the same page. In this way, each page is acquired.

According to this method, each page is captured more than once and multiple sheets are stored. The sheets to which the same synchronization information is added are grouped to be determined as the same page and thus each page is acquired. However, in this case, it takes a lot of time to acquire the multiple pages. Further, since each page should be captured more than once and multiple sheets are stored, a buffer memory should have a large capacity.

It is desirable to provide a method and apparatus for rapidly importing a pattern image, such as a barcode having multiple pages or the like, by using a minimum buffer memory capacity.

According to an embodiment of the invention, there is provided a method of capturing and reading a pattern image having multiple pages equal to or more than three pages generated from predetermined information by using capturing means provided in a reading apparatus. The pattern image is configured such that each page includes relevant page information indicating a position of the relevant page and the pages are displayed on a display screen sequentially and successively at a time interval and cyclically and repetitively. The method includes a step of, when two pages of the pattern image have been read, causing the reading apparatus to predict a capturing timing by the capturing means for each of remaining unread pages of the pattern image from a capturing time interval between the two pages of the pattern image and the relevant page information of each of the two pages of the pattern image, and to perform control such that each of the remaining unread pages of the pattern image is captured and read by the capturing means with the predicted capturing timing.

With this configuration, the pattern image is configured such that each page includes the relevant page information indicating the position of the relevant page. Thus, when two pages of the pattern image have been read, the page interval between the read two pages, that is, how many pages are placed between the read two pages can be detected from the relevant page information of each of the two pages of the pattern image. Therefore, if the capturing time interval between the two pages of the pattern image is divided by the detected page interval, the provision time interval for one page is determined.

In this way, if the provision time interval for one page is determined, the optimum capturing timing at which each of the remaining unread pages excluding the read two pages is captured can be calculated. In the step of causing the reading apparatus to predict the capturing timing for each of the remaining unread pages and to perform control for reading each remaining unread page of the pattern image, each page is captured and imported with the calculated capturing timing.

Therefore, all pages of the pattern image can be captured and imported for at least two cycles of the cyclic provision period of the pattern image having the multiple pages at a minimum so as to read the pattern image. In this case, the pages of the pattern image are sequentially read, so the capacity of the buffer memory is reduced, as compared with a case where each page is captured multiple times and the captured sheets are grouped. The memory capacity may correspond to the number of pages.

According to embodiments of the invention, with regard to the pattern image having multiple pages which are displayed on the display screen sequentially and successively at a predetermined time interval and cyclically and repetitively, all of the multiple pages can be rapidly read by using the minimum buffer memory capacity.

DESCRIPTION OF THE PREFERRED EMBODIMENTS

A method and apparatus for reading a pattern image according to an embodiment of the invention will be described with reference to the drawings. In the following embodiment, the pattern image is the pattern image of a two-dimensional barcode having a QR code (Registered Trademark).

Figure 2:
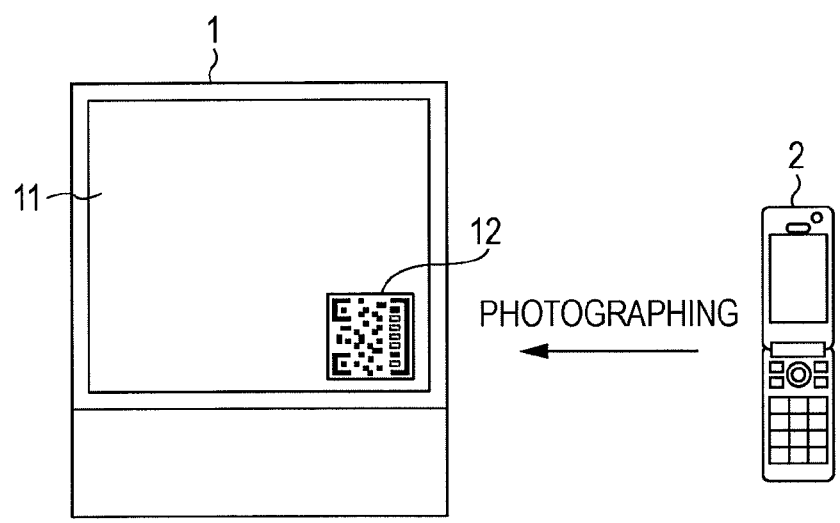
FIG. 2 is a diagram illustrating an example of the configuration of an information processing system to which a method of reading a pattern image according to an embodiment of the invention is applied.

FIG. 2 shows an example of the configuration of an information processing system to which a method of reading a code image according to an embodiment of the invention is applied. The information processing system of FIG. 2 includes an image display device 1, and a mobile phone terminal 2 having a camera serving as a capturing section.

In this embodiment, the image display device 1 provides advertising image information, and also displays information associated with the advertising on a display screen 11 as the pattern image 12 of a two-dimensional barcode having one or multiple pages (hereinafter, the pattern image of the two-dimensional barcode is referred to as a two-dimensional barcode image). In this example, the two-dimensional barcode image provides, for example, information including information regarding the location associated with advertising, provision time information, provision location information, the URL of a home page on which associated information is provided, provision source information, and the like.

In this embodiment, the two-dimensional barcode image is a pattern image including multiple pages. The pattern image of each page of the two-dimensional barcode image of this embodiment includes, as page index information, total page count information indicating the total number of pages (also referred to as total page count), and relevant page information indicating the page number of each page. In the embodiment, an example of the two-dimensional barcode image 12 is shown in FIGS. 1A and 1B.

Figure 1A:
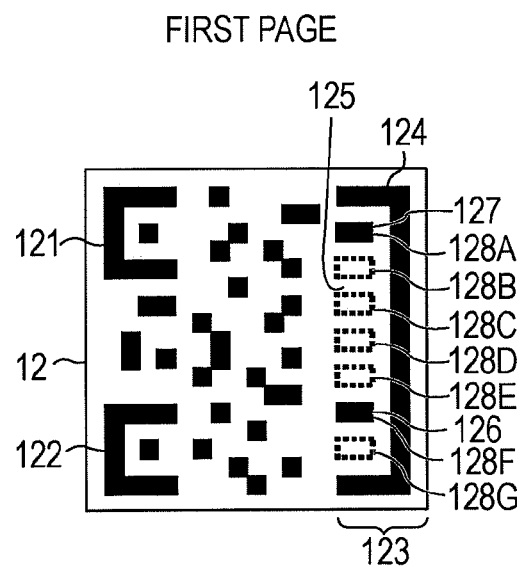
FIGS. 1A and 1B are diagrams showing an example of a two-dimensional barcode image for use in an embodiment of the invention.
Figure 1B:
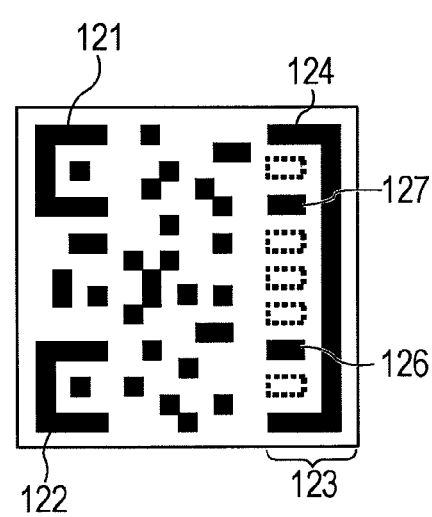

As shown in FIGS. 1A and 1B, the two-dimensional barcode image 12 of this example includes auxiliary patterns 121 and 122 at the upper and lower left corners, similarly to the pattern image of the typical two-dimensional barcode, and a page index pattern 123 at the right lateral portion. The page index pattern 123 is an example of page index information.

In the two-dimensional barcode image 12 of this example, a pattern obtained by converting code information is drawn in a space excluding the auxiliary patterns 121 and 122 and the page index pattern 123.

In this example, the page index pattern 123 has a U-shaped pattern 124, and a total page count bar 126 and a relevant page display bar 127 which are provided in a space 125 between the upper and lower bars of the U-shaped pattern 124. In this example, the total page count bar 126 and the relevant page display bar 127 are displayed as black lateral bars.

The U-shaped pattern 124 also serves as an auxiliary pattern which indicates the positions of the upper and lower right corners.

The position of the total page count bar 126 in the space 125 between the upper and lower bars of the U-shaped pattern 124 is changed depending on the total number of pages in the two-dimensional barcode image 12. The position of the relevant page display bar 127 in the space 125 between the upper and lower bars of the U-shaped pattern 124 is changed depending on the position of the relevant page in the two-dimensional barcode image.

In this example, an example regarding how to determine the position of the total page count bar 126 and the position of the relevant page display bar 127 in the space 125 will be described below.

In the case of the two-dimensional barcode image 12 of this embodiment, a plurality of lateral bar display regions corresponding to ((total page count)+1) are set in the space 125 between the upper and lower bars of the U-shaped pattern 124 in the vertical direction and at regular intervals.

In the example of FIGS. 1A and 1B, the maximum number of pages is six, and seven lateral bar display regions 128A, 128B, 128C, 128D, 128E, 128F, and 128G are set in the space 125 in the vertical direction and at regular intervals.

The total page count bar 126 is displayed at the ((total page count)+1)th position from among the seven lateral bar display regions 128A to 128G when counted from above. In the example of FIGS. 1A and 1B, the total page count bar 126 is displayed at the position of the sixth lateral bar display region 128F when counted from above, so it means that the total number of pages in the two-dimensional barcode image 12 is five. Of course, the position of the total page count bar 126 is not moved in the single two-dimensional barcode image in which the total number of pages is fixed.

The relevant page display bar 127 is displayed at the position of the page number of the relevant page from among the seven lateral bar display regions 128A to 128G when counted from above. In the two-dimensional barcode image 12 of FIG. 1A, the relevant page display bar 127 is displayed in the first lateral bar display region 128A, so it indicates that the relevant page is the first page from among the five pages in total. In the two-dimensional barcode image 12 of FIG. 1B, the relevant page display bar 127 is displayed in the second lateral bar display region 128B when counted from above, so it indicates that the relevant page is the second page from among the five pages in total.

Similarly, the position of the relevant page display bar 127 is sequentially moved to the lower lateral bar display region every page change.

The image display device 1 displays the respective pages of the image 12 of the two-dimensional barcode image having multiple pages on the display screen 11 sequentially at a predetermined time interval, for example, at a time interval of 100 milliseconds and successively starting with the first page. In this embodiment, the first page is displayed next to the last page, such that the two-dimensional barcode image 12 having multiple pages is displayed on the display screen cyclically and repetitively.

When the first page is displayed, in the portion of the page index pattern 123 of the two-dimensional barcode image 12, the position of the lateral bar display region 128G is displayed in black and the position of the lateral bar display region 128A is displayed in black. Thereafter, if a predetermined time, for example, 100 milliseconds, has elapsed, while the black bar at the position of the lateral bar display region 128G is not changed, the position of the lateral bar display region 128A is inverted in white and the position of the lateral bar display region 128B is inverted in black. Thus, the second page is displayed. Of course, the patterns other than the page index pattern are changed every page change.

When five pages are given, information of five patterns in total can be presented. Then, if it is assumed that information of 2000 characters per page can be presented, the two-dimensional barcode image 12 of FIGS. 1A and 1B can present information of 10000 characters for the five pages.

The page switching time in the two-dimensional barcode image 12 may be fixed at 100 milliseconds or may be arbitrary.

The user photographs the two-dimensional barcode image 12 displayed on the display screen 11 by the camera provided in the mobile phone terminal 2 so as to import multiple page patterns of the two-dimensional barcode image 12 having multiple pages.

In this case, the mobile phone terminal 2 of this embodiment has a barcode read mode and is configured such that, when the user operates the shutter button of the camera, the two-dimensional barcode image 12 having multiple pages is imported automatically and rapidly. The process for importing the two-dimensional barcode image 12 having multiple pages during the barcode read mode will be described below.

Example of Hardware Configuration of Image Display Device 1

Figure 3:
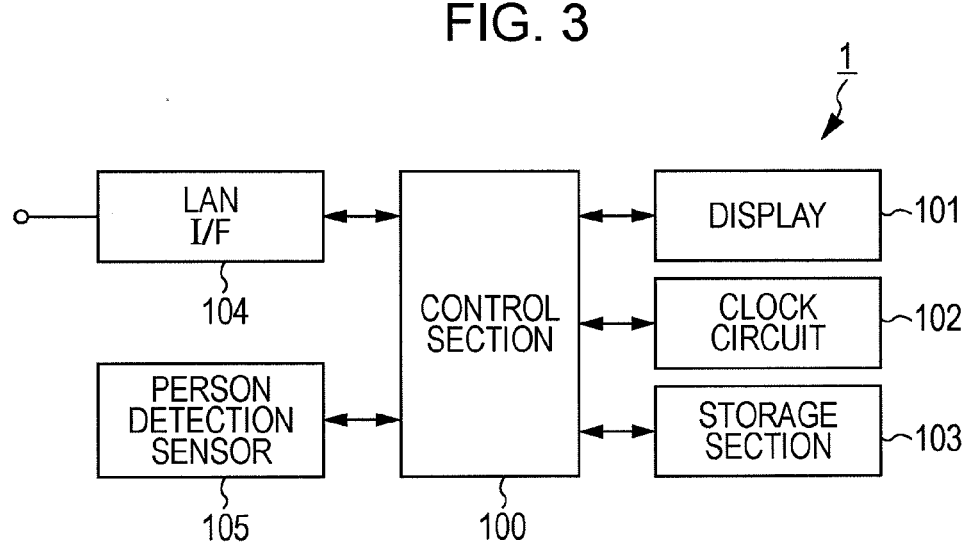
FIG. 3 is a block diagram showing an example of the hardware configuration of an image display device constituting the information processing system of FIG. 2.

FIG. 3 is a block diagram showing an example of the hardware configuration of the image display device 1 of this embodiment. That is, the image display device 1 of this embodiment is configured such that a display 101, a clock circuit 102, a storage section 103, a LAN (Local Area Network) interface 104, and a person detection sensor 105 are connected to a control section 100.

The display 101 is, for example, an LCD (Liquid Crystal Display), and includes the above-described display screen 11. Display image information is supplied from the control section 100 to the display 101, and a display image including the above-described two-dimensional barcode image is displayed on the display screen 11.

The clock circuit 102 generates time information indicating the current time in the form of year, month, day, hour, minute, and second, and supplies the generated time information to the control section 100. In this example, the clock circuit 102 is configured to generate time information in units of up to 1 millisecond. The time information from the clock circuit 102 is used to generate the page switching timing of the two-dimensional barcode image.

The storage section 103 is a hard disk device or a semiconductor memory device, and stores advertising information to be displayed or code information which is displayed as a two-dimensional barcode image.

The LAN interface 104 is connected to a LAN to which a server apparatus is connected. In this example, the control section 100 acquires advertising information and code information, which is displayed as a two-dimensional barcode image, transmitted from the server apparatus through the LAN interface 104, and stores the acquired advertising information and code information in the storage section 103.

The person detection sensor 105 detects the approach and withdrawal of a person with respect to the image display device 1, and is, for example, an infrared sensor. The control section 100 monitors the sensor output of the person detection sensor 105, and if the approach of a person is detected, starts image display of advertising information with a two-dimensional barcode image. Then, if it is determined from the sensor output of the person detection sensor 105 that the person is away (withdrawn) from the image display device 1, the control section 100 performs control so as to stop image display.

Example of Display Process Operation of Image Display Device 1

Figure 4:
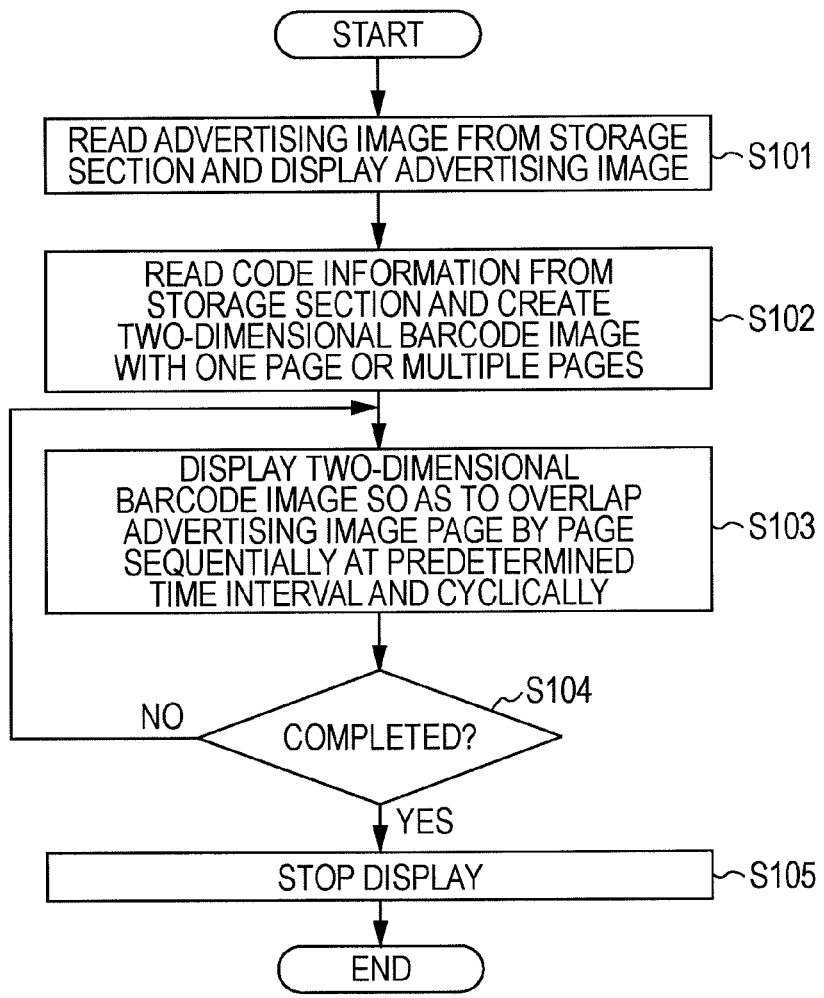
FIG. 4 is a flowchart illustrating an example of the process operation in an image display device constituting the information processing system of FIG. 2.

FIG. 4 is a flowchart showing an example of a process operation which is executed by the control section 100 when the approach of a person is detected from the sensor output from the person detection sensor 105. That is, if the approach of a person is detected from the sensor output of the detection sensor 105, the control section 100 starts the process of FIG. 4.

First, the control section 100 reads an advertising image from the storage section 103 and supplies a display image to the display 101 so as to be displayed on the display screen 11 (Step S101).

The control section 100 also reads information, in this example, code information, which is displayed as a two-dimensional barcode image, from the storage section 103, detects the amount of information of the code information, and generates information regarding a two-dimensional barcode image having one or multiple pages in accordance with the amount of information (Step S102).

In Step S102, the control section 100 determines from the amount of information of the code information whether or not the code information can be displayed as a two-dimensional barcode image having one page. When it is determined that the code information can be displayed as a two-dimensional barcode image having one page, the control section 100 generates a two-dimensional barcode image having one page. In this case, the two-dimensional barcode image is such that the total page count bar 126 is fixedly displayed in the lateral bar display region 128B of FIGS. 1A and 1B, and the relevant page display bar 127 is fixedly displayed in the lateral bar display region 128A.

If it is determined from the amount of information of the code information that the code information is not displayed as a two-dimensional barcode image having one page, the control section 100 divides the code information by the amount of information corresponding to one page and creates multiple pages. Thereafter, the control section 100 detects the number of pages after being divided, and determines the display position of the total page count bar 126 in the two-dimensional barcode image. As described with reference to FIGS. 1A and 1B, image information of the respective pages of the two-dimensional barcode image is generated from the multiple pages having the relevant page display bars at different positions.

Next, the control section 100 displays the generated two-dimensional barcode image so as to overlap the advertising image (Step S103). In this case, if the two-dimensional barcode image has one page, the control section 100 continues to display the two-dimensional barcode image of one page so as to overlap the advertising image. If the two-dimensional barcode image has multiple pages, the control section 100 displays the pattern images of the respective pages of the two-dimensional barcode image having multiple pages cyclically and repetitively so as to overlap the advertising image while switching the pages at a predetermined time interval set in advance.

After Step S103, the control section 100 determines whether a person is away from the image display device 1 or not so as to determine whether or not to end display (Step S104). If it is determined in Step S104 that a person is not away from the image display device 1, the control section 100 repeats Step S103. When it is determined in Step S104 that a person is away from the image display device 1 and it is time to end display, the control section 100 stops image display (Step S105) and ends the process routine.

Example of Hardware Configuration of Mobile Phone Terminal 2

Figure 5:
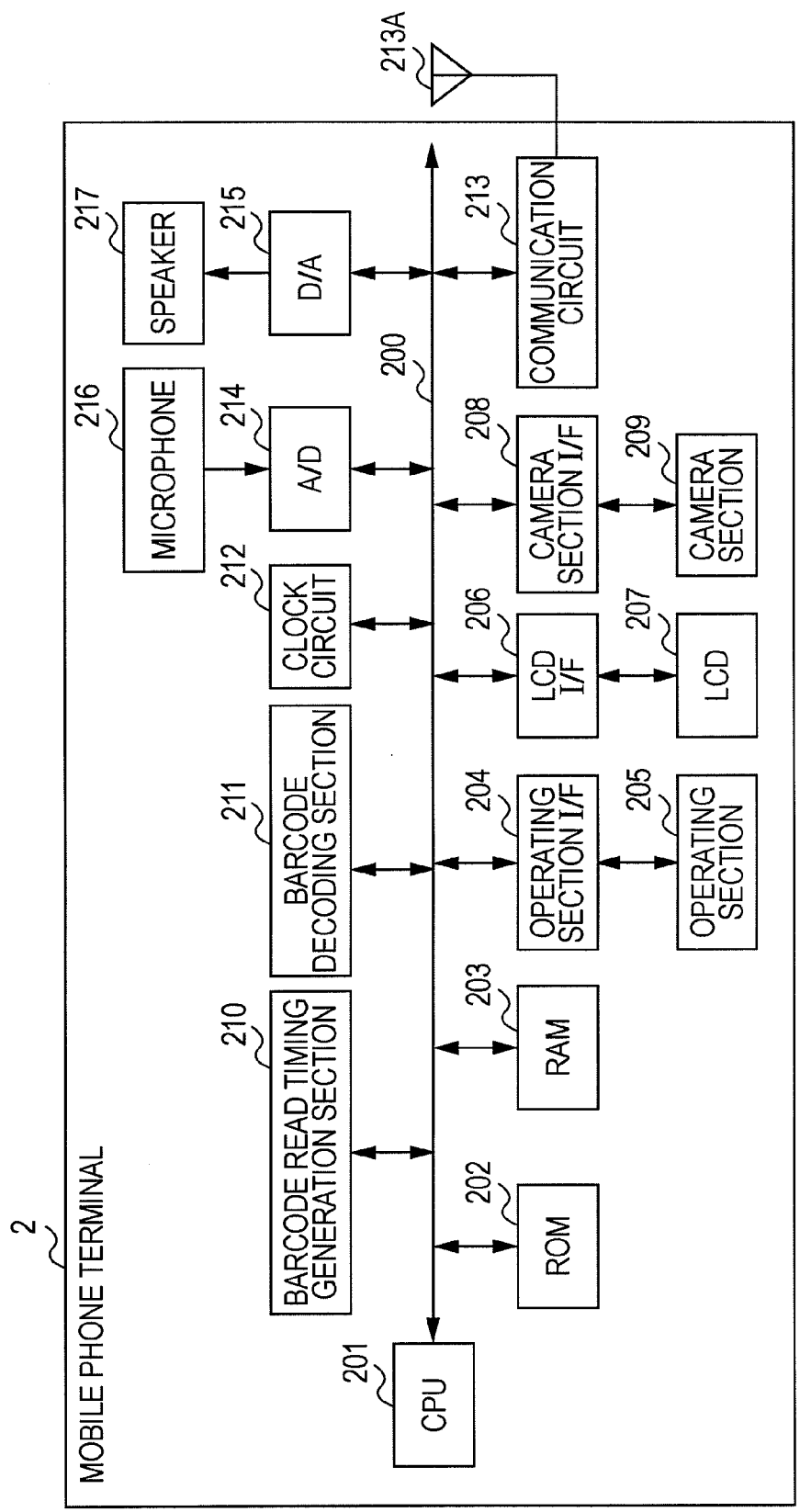
FIG. 5 is a block diagram showing an example of the hardware configuration of a mobile phone terminal constituting the information processing system of FIG. 2.

The mobile phone terminal 2 of this embodiment includes a microcomputer as a control section. FIG. 5 is a block diagram showing an example of the hardware configuration of the mobile phone terminal 2 of this embodiment.

That is, the mobile phone terminal 2 of this embodiment is configured such that a ROM (Read Only Memory) 202 storing a program and a RAM (Random Access Memory) 203 for a work area are connected to a CPU (Central Processing Unit) 201 through a system bus 200.

An operating section 205 is connected to the system bus 200 through an operating section interface 204. An LCD 207 serving as a display element is also connected to the system bus 200 through an LCD interface 206. A camera section 209 which is an example of the capturing section is also connected to the system bus 200 through a camera section interface 208.

A barcode read timing generation section 210, a barcode decoding section 211, a clock circuit 212, a communication circuit 213, an A/D converter 214, and a D/A converter 215 are also connected to the system bus 200.

The communication circuit 213 is used for telephone communication, and a transmission/reception antenna 213A is connected thereto. The communication circuit 213 exchanges control information or telephone voice with a contact through the base station of the mobile phone.

A microphone 216 for sending is connected to the A/D converter 214. An analog signal of sending voice collected by the microphone 216 is converted into a digital signal by the A/D converter 214, and the digital signal is supplied to the communication circuit 213 through the system bus 200 and then sent to the contact.

A speaker 217 is connected to the D/A converter 215. A digital signal of received voice which is received through the communication circuit 213 is converted into an analog signal by the D/A converter 215, and the analog signal is supplied to the speaker 217 and then reproduced as sound.

The CPU 201 may configure the barcode read timing generation section 210 and the barcode decoding section 211 as the software process functions by the program stored in the ROM 202.

The operating section 205 is a key operating section having a numeric keypad for inputting a telephone number, a shutter key for the camera section 209, a cursor key, an OK key, and other keys. If any key of the operating section 205 is operated, the CPU 201 receives an operation signal according to the operated key from the operating section 205 through the operating section interface 204, determines what the operated key is, and executes a process according to the determination result.

If the user operates a predetermined key of the operating section 205, the camera section 209 supplies a captured image of a subject to the system bus 200 through the camera section interface 208 under the control of the CPU 201.

The mobile phone terminal 2 of this embodiment includes a barcode read mode as well as a typical camera mode. During the typical camera mode, the CPU 201 performs control such that the captured image of the subject when the user operates the shutter key is imported from the camera section 209.

During the barcode read mode, if the OK key or the like is pressed and a read start operation is made, the CPU 201 executes a read control process for importing a two-dimensional barcode image from the camera section 209. That is, the CPU 201 controls the capturing timing in the camera section 209 as described below, such that the captured image of the two-dimensional barcode image having one or multiple pages is imported from the camera section 209.

The barcode read timing generation section 210 generates the capturing timing of the two-dimensional barcode image in the camera section 209 as described below when the read process starts during the barcode read mode. The barcode read timing generation section 210 also corrects the generated capturing timing of the two-dimensional barcode image from the actual import result of the pages of the two-dimensional barcode image.

The barcode decoding section 211 decodes code information from the two-dimensional barcode image captured by and imported from the camera section 209, and stores the code information in an internal buffer memory. As occasion demands, the code information as the decoding result stored in the buffer memory is converted into display data and then displayed on the LCD 207 under the control of the CPU 201.

The clock circuit 212 generates time information indicating the current time in the form of year, month, day, hour, minute, and second, and supplies the generated time information to the CPU 201. In this example, the clock circuit 212 is configured to generate time information in units of up to 1 millisecond. The time information from the clock circuit 212 is used during the capturing timing generation process for generating the capturing timing in the camera section 209 by the barcode read timing generation section 210.

Example of Process Operation During Barcode Read Mode in Mobile Phone Terminal 2

Figure 6:
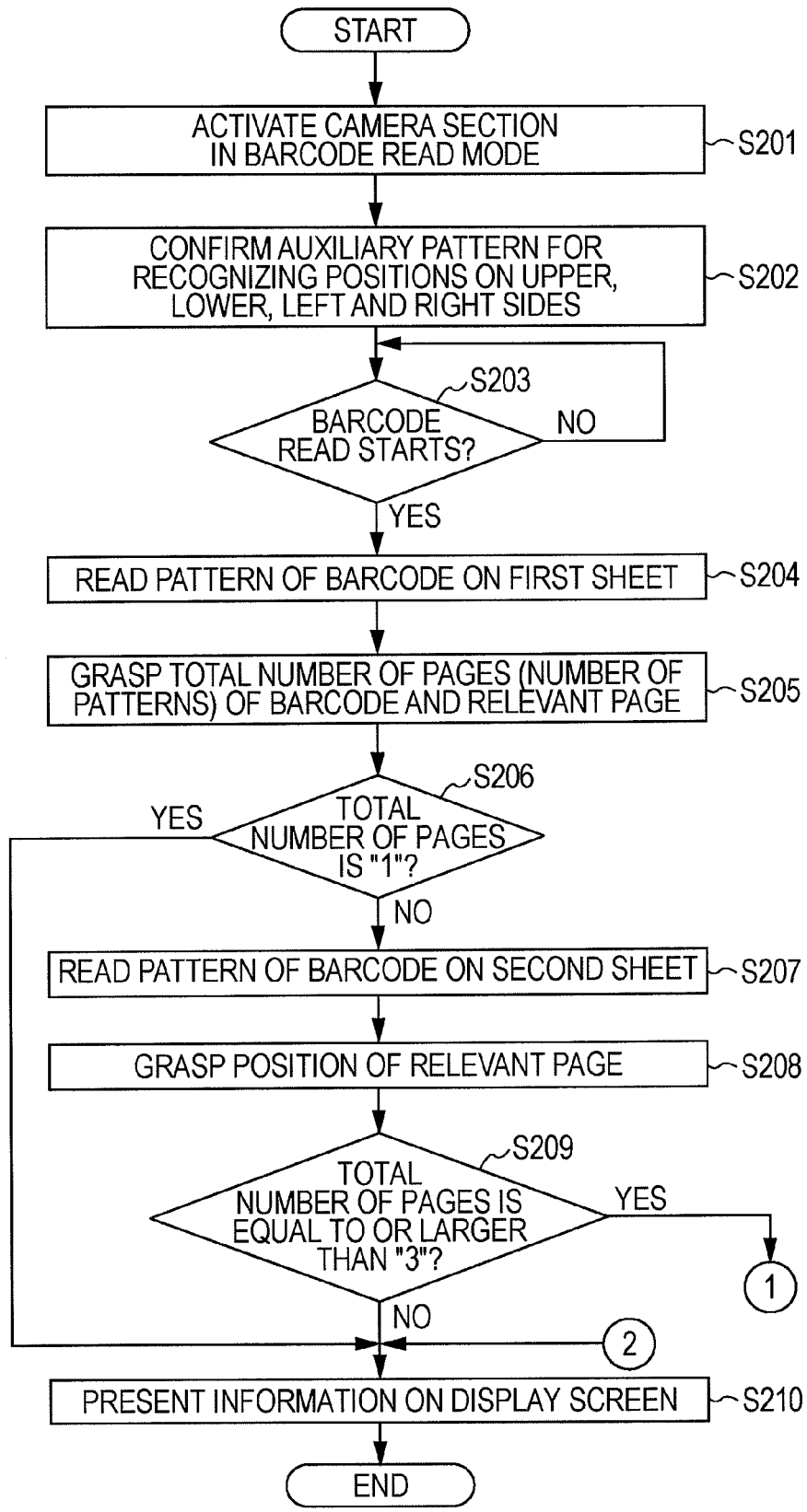
FIG. 6 is a part of a flowchart illustrating an example of the process operation in a mobile phone terminal constituting the information processing system of FIG. 2.
Figures 7, 8:
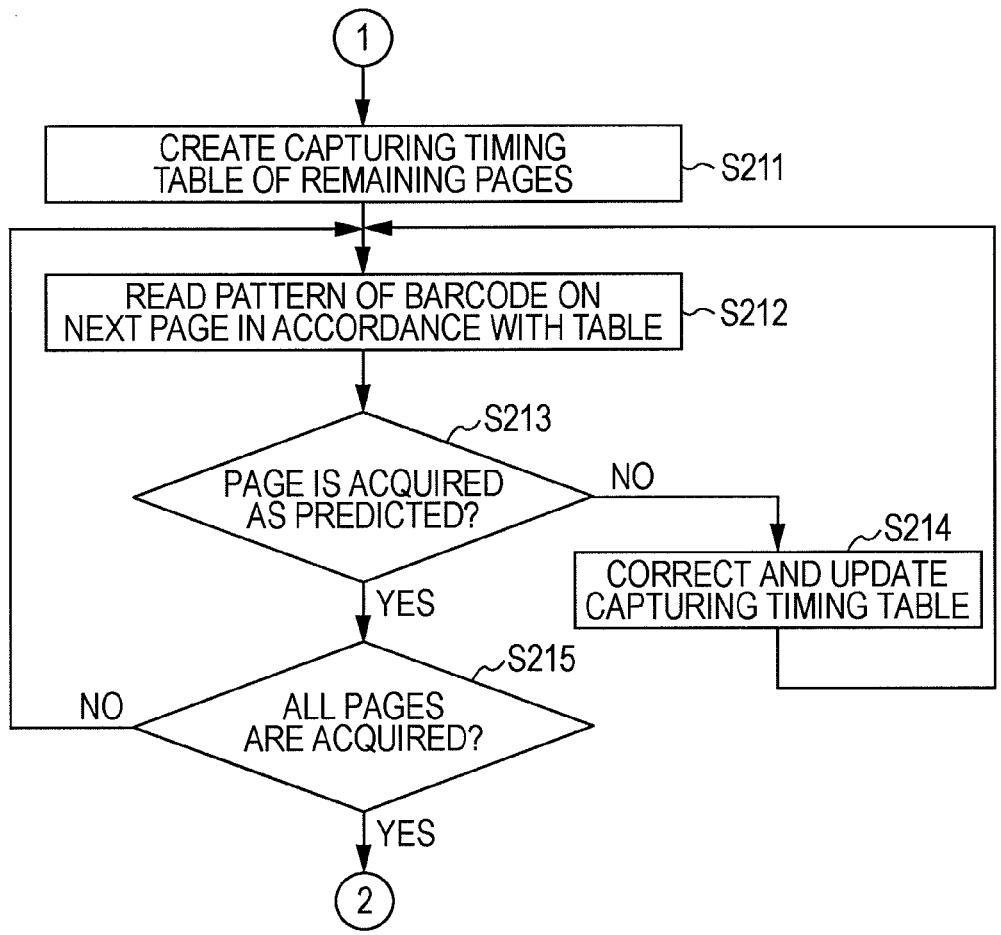
FIG. 7 is a part of the flowchart illustrating an example of the process operation in a mobile phone terminal constituting the information processing system of FIG. 2.
FIG. 8 is a diagram illustrating an example of the process operation in a mobile phone terminal constituting the information processing system of FIG. 2.

FIGS. 6 and 7 are flowcharts showing an example of the process operation by the mobile phone terminal 2 during the barcode read mode. The CPU 201 executes each step in the flowcharts of FIGS. 6 and 7 according to the program for the barcode read mode stored in the ROM 202 while using the RAM 203 as a work area.

If the user selects the barcode read mode from the function menu of the mobile phone terminal 2, the barcode read mode shown in FIG. 6 starts.

First, the CPU 201 activates the camera section 209 in the barcode read mode (Step S201). Thus, a captured image from the camera section 209 is imported to the system bus 200 through the camera section interface 208.

The user views the display screen of the LCD 207 of the mobile phone terminal 2 and adjusts the position of the mobile phone terminal 2 such that a two-dimensional barcode image displayed on the display screen 11 of the image display device 1 is displayed at the center of the display screen of the LCD 207.

At this time, the CPU 201 confirms the auxiliary patterns for recognizing the upper, lower, left, and right corners from the captured image of the two-dimensional barcode image 12 imported from the camera section 209 (Step S202). Though not shown in this flowchart, when the OK key is operated and a barcode read start instruction is made in a state where the auxiliary patterns are not possible to be confirmed, a barcode image is not read, so the CPU 201 performs error display.

Next, the CPU 201 waits for the barcode read start instruction according to the operation of the OK key by the user (Step S203). When it is determined in Step S203 that the barcode read start instruction is made, the CPU 201 reads the pattern image of the first sheet of the two-dimensional barcode image (Step S204). The CPU 201 acquires the import time of the first sheet of the two-dimensional barcode image from the time information from the clock circuit 212.

The process for reading the two-dimensional barcode image in Step S204 includes a process for importing the captured image from the camera section 209 and performing decoding by the barcode decoding section 211 so as to confirm whether or not decoding is possible. When it is confirmed that decoding is not possible, a process for importing the captured image from the camera section 209 until decoding is possible with respect to the two-dimensional barcode image is included in the process of Step S204.

After the pattern image of the first sheet of the two-dimensional barcode image is read in Step S204, the total number of pages and the position of the pattern image of the first sheet of the two-dimensional barcode in the total number of pages are grasped from the page index pattern 123 (Step S205).

In Step S205, the CPU 201 grasps the total number of pages of the two-dimensional barcode image from the position of the total page count bar 126 in the page index pattern 123. In the example of FIGS. 1A and 1B, the total page count bar 126 is positioned in the lateral bar display region 128F from among the seven lateral bar display regions 128A to 128G, so the total number of pages is grasped to be five.

In Step S205, the CPU 201 also grasps the position of the relevant page in the total number of pages from the position of the relevant page display bar 127 of the page index pattern 123.

Next, the CPU 201 determines whether or not the total number of pages grasped in Step S205 is "1" (Step S206). When it is determined in Step S206 that the total number of pages is "1", the CPU 201 determines that the reading of the two-dimensional barcode image ends, and displays information read from the two-dimensional barcode image on the display screen of the LCD 207 (Step S210). Then, the process routine ends.

When it is determined in Step S206 that the total number of pages is not "1", the CPU 201 reads the pattern image of the second sheet of the two-dimensional barcode image from the captured image from the camera section 209 (Step S207). The CPU 201 acquires the import time of the pattern image of the second sheet from the time information from the clock circuit 212.

The process for reading the two-dimensional barcode image in Step S207 also includes a process for decoding the imported two-dimensional barcode image by the barcode decoding section 211 so as to confirm whether or not decoding is possible, similarly to the process of Step S204. A process for repetitively importing the two-dimensional barcode image until a two-dimensional barcode image capable of being decoded is obtained is also included.

After the pattern image of the second sheet of the two-dimensional barcode image is read in Step S207, the CPU 201 grasps the position of the pattern image of the second sheet in the total number of pages from the relevant page display bar 127 of the page index pattern 123 (Step S208).

Next, the CPU 201 determines whether the total number of pages of the two-dimensional barcode image is equal to or more than 3 (Step S209).

When it is determined in Step S209 that the total number of pages of the two-dimensional barcode image is less than 3, that is, 2, if the pattern image of the second sheet of the two-dimensional barcode image is read, it is determined that all the pages are read. Thus, the CPU 201 displays information read from the two-dimensional barcode image on the display screen of the LCD 207 (Step S210). Then, the process routine ends.

When it is determined in Step S209 that the total number of pages of the two-dimensional barcode image is equal to or more than 3, the CPU 201 calculates the import timing, that is, the capturing timing, of each of the remaining unread pages of the two-dimensional barcode image from the camera section 209, and generates and stores a capturing timing table based on the calculation result (Step S211).

The process of Step S211 will be described in connection with the two-dimensional barcode image 12 having five pages shown in FIGS. 1A and 1B.

In Step S211, the CPU 201 first grasps the positions of the first and second sheets of the two-dimensional barcode image grasped in Steps S205 and 5208 in the total number of pages. That is, the page numbers of the first and second sheets of the two-dimensional barcode image are grasped. The CPU 201 also grasps the capturing time of the first and second sheets of the two-dimensional barcode image acquired in Steps 5204 and Step S207.

Next, the CPU 201 calculates the display time per page, that is, the page switching time of the two-dimensional barcode image, from the grasped relevant page information of each of the first and second sheets of the two-dimensional barcode image and information regarding the capturing time.

With regard to the two-dimensional barcode image 12 having five pages of FIGS. 1A and 1B, it is assumed that the grasped relevant page information of each of the first and second sheets of the two-dimensional barcode image and the information regarding the capturing time are as shown in FIG. 8.

In the example of FIG. 8, the first sheet refers to the pattern image of the second page of the two-dimensional barcode image, and the capturing time thereof is 200 milliseconds since the barcode read mode starts in Step S203. The second sheet refers to the pattern image of the fourth page of the two-dimensional barcode image, and the capturing time thereof is 400 milliseconds since the barcode read mode starts in Step S203.

As a result, the capturing time interval between the read two pages is 400−200=200 milliseconds. Therefore, in this example, the page switching time T is expressed as follows.

$$T=(400-200)/(4-2)=100 \text{ milliseconds}$$

After the page switching time T is calculated in the above-described manner, the CPU 201 grasps the remaining unread pages of the two-dimensional barcode image from the total number of pages grasped in Step S205 and the page numbers of the first and second sheets of the two-dimensional barcode image. In the two-dimensional barcode image 12 of FIGS. 1A and 1B, the remaining unread pages of the two-dimensional barcode image are the first page, the second page, and the fifth page.

The CPU 201 predicts the capturing timing, at which each of the grasped remaining unread pages of the two-dimensional barcode image can be read fastest, by using the calculated page switching time T and information regarding the unread pages, and generates a capturing timing table. In this example, for example, a capturing timing table shown in FIG. 9 is generated.

Figures 9, 10:
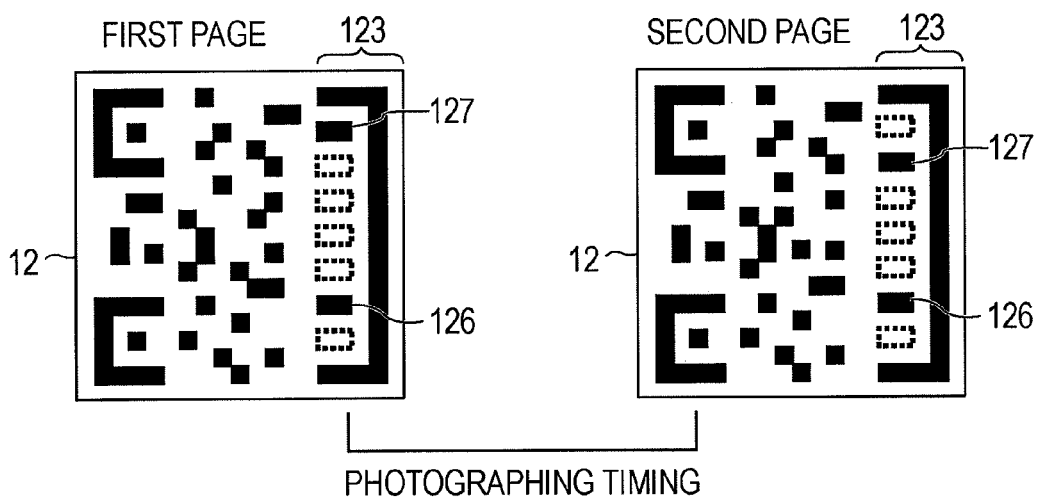
FIG. 9 is a diagram illustrating an example of the process operation in a mobile phone terminal constituting the information processing system of FIG. 2.
FIG. 10 is a diagram illustrating an example of the process operation in a mobile phone terminal constituting the information processing system of FIG. 2.

The capturing timing table of FIG. 9 is generated as follows. That is, if it is assumed that the second page and the fourth page are calculated in the first round of the two-dimensional barcode image 12 having five pages in total, in the first round, the fifth page is predicted to be next presented 100 milliseconds after the fourth page is presented (that is, 500 milliseconds), so the fifth page is planned to be imported at the predicted time.

Next, the first page is predicted to be presented at the beginning of the second round of the two-dimensional barcode image 12, so the first page is planned to be imported at 600 milliseconds. Further, the third page is predicted to be presented at 800 milliseconds in the second round, so the third page is planned to be imported at 800 milliseconds.

In this way, in Step S211, if the capturing timing table for the unread pages is created, the CPU 201 tries to read the unread pages of the two-dimensional barcode image in accordance with the created capturing timing table (Step S212).

Next, the CPU 201 determines from the page index pattern of the two-dimensional barcode image imported in Step S212 whether or not a page is possible to be imported as predicted (Step S213), and when it is determined that a page is not possible to be imported as predicted, corrects and updates the capturing timing table (Step S214).

In Step S214, when the CPU 201 tries to import the fifth page at 500 milliseconds but the fourth page is acquired at that time, the page switching time T increases longer than 100 milliseconds, and the capturing timing table is created again. When the fifth page is tried to be imported at 500 milliseconds but the first page is acquired at that time, the page switching time T decreases shorter than 100 milliseconds, and the capturing timing table is created again.

In the former case, the acquired fourth page has already been acquired, so it is not necessary to read the two-dimensional barcode image of the relevant page. Thus, the CPU 201 updates the capturing timing table such that the unread fifth page is acquired after the third page is acquired in the second round.

In the latter case, the acquired first page is an unread page, so the CPU 201 reads the first page. Then, the CPU 201 grasps the third page and the fifth page as the unread pages, and updates the capturing timing table such that the third page and the fifth page are acquired at photographing time to be predicted in the second round.

In Step S212, when a page of the two-dimensional barcode image is tried to be imported and as shown in FIG. 10, the capturing timing becomes the transition time between the pages, the capturing timing table is corrected as follows.

In this case, both the relevant page display bars 127 of the previous and subsequent pages are photographed in the portion of the relevant page display bar 127 of the page index pattern of the imported image.

Accordingly, when the capturing timing leans toward the previous page, the relevant page display bar 127 of the previous page is displayed in black darker than the relevant page display bar 127 of the subsequent page. Further, when the capturing timing leans toward the subsequent page, the relevant page display bar 127 of the subsequent page is displayed in black darker than the relevant page display bar 127 of the previous page.

From the above description, when the capturing timing is the transition time of the previous and subsequent pages, the capturing timing can be appropriately corrected on the basis of the degree of shading of the relevant page display bars 127 of the previous and subsequent pages in the read image.

After the capturing timing table is corrected and updated in Step S214, the CPU 201 returns to Step S212, and repeats the processes of Step S212 and later.

When it is determined in Step S213 that a page is possible to be acquired as predicted, the CPU 201 determines whether or not all the pages of the two-dimensional barcode image are acquired (Step S215). In Step S215, when it is determined that unread pages still remain, the CPU 201 returns to Step S212 without correcting and updating the capturing timing table, and repeats the processes of Step S212 and later.

When it is determined in Step S215 that all the pages are read, the CPU 201 progresses to Step S210, and decodes code information corresponding to the read two-dimensional barcode image to generate display information, and display the display information on the display screen so as to present the code information. Then, the process routine ends.

As described above, all the pages of a two-dimensional barcode image having three or more pages can be read in two rounds at the minimum. Therefore, it should suffice that the pages of the two-dimensional barcode image are stored in the buffer memory page by page, so it should be suffice that the buffer memory has the capacity corresponding to the number of pages.

Another Example of Method of Reading Two-Dimensional Barcode Image

In the foregoing embodiment, when a two-dimensional barcode image having three or more pages in total is read, a capturing timing table is created for all of the unread pages, and the pages are read on the basis of the capturing timing table.

Instead of creating the capturing timing table for all of the unread pages, the capturing timing may be predicted for each of the unread pages, and the unread pages may be sequentially read.

In this case, the CPU 201 grasps all the unread pages, predicts the capturing timing for a page which is read with the nearest timing as the next capturing timing, and tries to read the relevant page with the predicted capturing timing.

Similarly to the foregoing embodiment, it is assumed that the page switching time interval is corrected according to whether a page is possible to be acquired as predicted or not by using the trial result. Then, the capturing timing is predicted for a page which is read with the next nearest timing by using the corrected page switching time interval, and the relevant page is tried to be read with the predicted capturing timing.

The above-described process is repetitively performed page by page until all the unread pages are read.

With this example, all the pages of a two-dimensional barcode image having three or more pages can be read in two rounds at the minimum.

Another Example of Two-Dimensional Barcode Image

As shown in FIGS. 1A and 1B, the two-dimensional barcode image in the foregoing embodiment is configured such that the page index pattern is formed in a portion of the pattern image of the square two-dimensional barcode.

Figure 11:
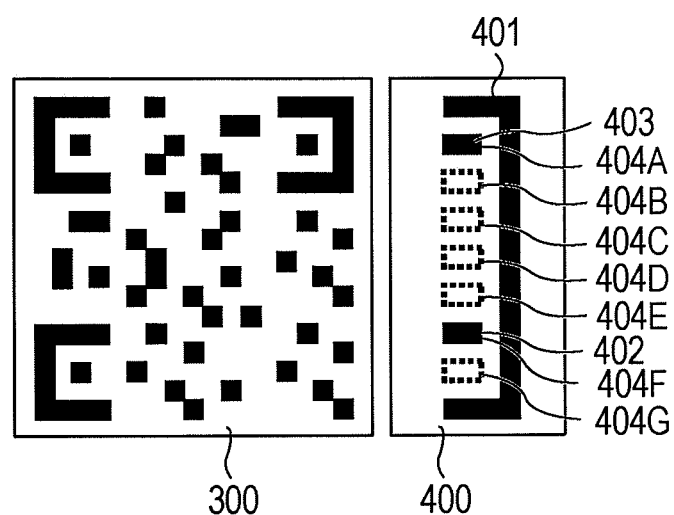
FIG. 11 is a diagram showing another example of a two-dimensional barcode image for use in an embodiment of the invention.

Alternatively, as shown in FIG. 11, the square pattern image 300 of a two-dimensional barcode may be identical to the typical two-dimensional barcode image (barcode pattern), and a page index pattern 400 may be formed in a region different from the square pattern image 300 of the two-dimensional barcode. In this case, with a pair of the square pattern image 300 of the two-dimensional barcode and the page index pattern 400, a two-dimensional barcode image having multiple pages is formed.

In the example of FIG. 11, the page index pattern 400 is identical to the page index pattern 123 in the example of FIGS. 1A and 1B. That is, lateral bar display regions 404A to 404G are set between the upper and lower bars of a U-shaped pattern 401. One of the lateral bar display regions 404A to 404G becomes a total page count bar 402, and another becomes a relevant page display bar 403.

The examples of the two-dimensional barcode image are given assuming that the total number of pages is not fixed. Meanwhile, in the case of a two-dimensional barcode image having a fixed total number of pages, no total page count bar may be provided.

Figure 12:
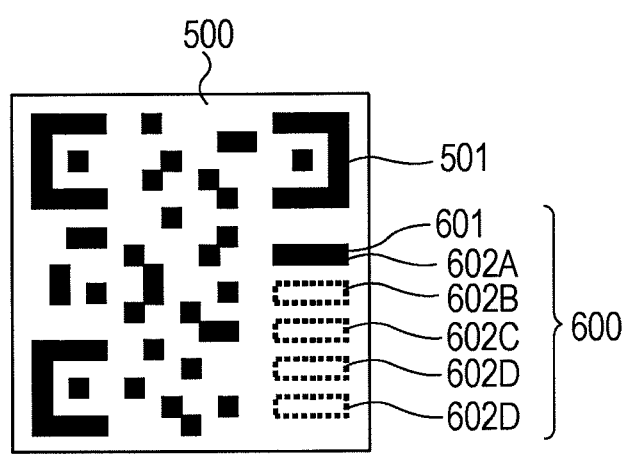
FIG. 12 is a diagram showing yet another example of a two-dimensional barcode image for use in an embodiment of the invention.

As an example of this case, a two-dimensional barcode image 500 of FIG. 12 is exemplified. In this example, the total number of pages is five. In the two-dimensional barcode image 500, similarly to the two-dimensional barcode image 12 shown in FIGS. 1A and 1B, a page index pattern 600 is formed in a portion of the square two-dimensional barcode image 500.

In the example of FIG. 12, the page index pattern of the two-dimensional barcode image 500 is provided below an auxiliary pattern 501 indicating the upper right corner, and five lateral bar display regions 602A, 602B, 602C, 602D, and 602E arranged in the vertical direction are used as the display region of the relevant page display bar 601.

That is, the position of the relevant page is indicated according to in which lateral bar display region from among the five lateral bar display regions 602A, 602B, 602C, 602D, and 602E the relevant page display bar 601 is displayed in black when counted from above. The example of FIG. 12 is the two-dimensional barcode image of the first page.

In the example of FIG. 12, the two-dimensional barcode image has a fixed total number of pages, so when the amount of code information is small, all of the pages may not be used. In this case, with regard to an unused page, a code pattern indicating that the relevant page is unused is formed.

[Other Embodiments and Modifications]

In the foregoing embodiment, for ease of understanding of the invention, the page index information in the two-dimensional barcode image is indicated by the page index pattern including the total page count bar and the relevant page display bar.

Alternatively, unlike the above-described examples, the page index information may be included in the code information and consequently included in the barcode pattern, instead of being presented so as to be easily recognizable as an image pattern. In this case, the total page count bar or the relevant page display bar may not be displayed as an image pattern.

Although in the foregoing embodiment, a two-dimensional barcode image has a comparatively small number of pages, a two-dimensional barcode image having a larger number of pages, for example, 100 pages, may be provided.

Although in the embodiment, a pattern image is a two-dimensional barcode image, such as a QR code (Registered Trademark) or the like, a pattern image to be read is not limited to the two-dimensional barcode image, and any pattern image may be used insofar as it is presented in the form of multiple pages.

Although in the foregoing embodiment, an example where a mobile phone terminal is used as an apparatus for reading a pattern image has been described, the apparatus for reading a pattern image is not limited to the mobile phone terminal, and any apparatus may be used as the apparatus for reading a pattern image insofar as it includes a capturing function.

The present application contains subject matter related to that disclosed in Japanese Priority Patent Application JP 2008-290431 filed in the Japan Patent Office on Nov. 13, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method of capturing and reading a pattern image having multiple pages equal to or more than three pages generated from predetermined information by using capturing means provided in a reading apparatus, wherein the multiple pages are dynamic picture images displayed on a display screen sequentially and successively at a time interval and cyclically and repetitively, and the pattern image is configured such that each page includes relevant page information of the pattern image indicating a position of the relevant page, the method comprising a step of:

when two pages of the pattern image have been read, predicting a capturing timing of each remaining unread page of the pattern image according to a capturing time interval between the first two pages of the pattern image and relevant page information of each of the first two pages of the pattern image;

generating a capturing timing table based on the calculation result; and capturing each remaining unread page of the pattern image according to the generated timing table; and correcting the predicted capturing timing in the table when each page of the pattern image has not been read in accordance with capturing timing in the table in the step of capturing and reading the remaining unread pages of the pattern image.

2. The method according to claim 1,
wherein each page of the pattern image includes total page count information indicating the total number of pages.

3. The method according to claim 1,
wherein, a process for the predicting and reading is executed page by page.

4. The method according to claim 3,
wherein, when the page of the pattern image is not read as predicted, the result that the pattern image of the page is not read as predicted is reflected in the prediction of a capturing timing when the next reading is executed.

5. The method according to claim 1,
wherein the pattern image is a pattern of a two-dimensional barcode.

6. An information processing method for a system including an image display device with a display screen for image display and a reading apparatus with capturing means for capturing a pattern image displayed on the display screen,
wherein the image display device executes the steps of:
generating a pattern image having multiple pages equal to or more than three pages generated from predetermined information,
wherein the multiple pages are dynamic picture images displayed on the display screen, and the pattern image includes relevant page information of the pattern image indicating a position of the relevant page; and
displaying the pattern image generated in the step of generating the pattern image on the display screen page by page sequentially and successively at a time interval and cyclically and repetitively, and
the reading apparatus executes a step of when two pages of the pattern image are read;
predicting a capturing timing of each remaining unread page of the pattern image according to a capturing time interval between the first two pages of the pattern image and relevant page information of each of the first two pages of the pattern image;
generating a capturing timing table based on the calculation result;
capturing each remaining unread page of the pattern image according to the generated timing table; and
correcting the predicted capturing timing in the table when each page of the pattern image has not been read in accordance with capturing timing in the table in the step of capturing and reading the remaining unread pages of the pattern image.

7. An apparatus for reading a pattern image having multiple pages equal to or more than three pages generated from predetermined information,
wherein the multiple pages are dynamic picture images displayed on a display screen sequentially and successively at a time interval and cyclically and repetitively, and the pattern image includes relevant page information of the pattern image indicating a position of the relevant page, the apparatus comprising:
capturing means for capturing the pattern image displayed on the display screen;
reading means for reading the predetermined information and the relevant page information from the pattern image captured by the capturing means; and
control means for, when two pages of the pattern image are read by the reading means,
predicting a capturing timing of each remaining unread page of the pattern image according to a capturing time interval between the first two pages of the pattern image and relevant page information of each of the first two pages of the pattern image;
generating a capturing timing table based on the calculation result;
capturing each remaining unread page of the pattern image according to the generated timing table; and
correcting the predicted capturing timing in the table when each page of the pattern image has not been read in accordance with capturing timing in the table in the step of capturing and reading the remaining unread pages of the pattern image.

8. A program for reading a pattern image having multiple pages equal to or more than three pages generated from predetermined information,
wherein the multiple pages are dynamic picture images displayed on a display screen sequentially and successively at a time interval and cyclically and repetitively, and the pattern image includes relevant page information of the pattern image indicating a position of the relevant page, the program causing a computer, which is provided in an apparatus for reading a pattern image which captures and reads the pattern image by using capturing means, to function as:
reading means for reading the predetermined information and the relevant page information from the pattern image captured by the capturing means;
control means for, when two pages of the pattern image are read by the reading means, determining a total number of pages of the pattern image;
when the total number of pages of the pattern image is equal to or more than 3, predicting a capturing timing of each remaining unread page of the pattern image according to a capturing time interval between the first two pages of the pattern image and relevant page information of each of the first two pages of the pattern image;
generating a capturing timing table based on the calculation result; and
capturing each remaining unread page of the pattern image according to the generated timing table; and
correcting the predicted capturing timing in the table when each page of the pattern image has not been read in accordance with capturing timing in the table in the step of capturing and reading the remaining unread pages of the pattern image.

9. A pattern image having multiple pages equal to or more than three pages generated from predetermined information,
wherein the multiple pages are dynamic picture images displayed on a display screen, and
wherein the pattern image includes total page count information indicating the total number of pages and relevant page information indicating a position of a relevant page,
wherein the pattern image is utilized in a process comprising the steps of:
predicting a capturing timing of each remaining unread page of the pattern image according to a capturing time interval between the first two pages of the pattern image and relevant page information of each of the first two pages of the pattern image;

generating a capturing timing table based on the calculation result; and capturing each remaining unread page of the pattern image according to the generated timing table; and correcting the predicted capturing timing in the table when each page of the pattern image has not been read in accordance with capturing timing in the table in the step of capturing and reading the remaining unread pages of the pattern image.

10. An apparatus for reading a pattern image having multiple pages equal to or more than three pages generated from predetermined information, wherein the multiple pages are dynamic picture images displayed on a display screen sequentially and successively at a time interval and cyclically and repetitively, and the pattern image includes relevant page information of the pattern image indicating a position of the relevant page, the apparatus comprising:

a capturing section configured to capture the pattern image displayed on the display screen;

a reader configured to read the predetermined information and the relevant page information from the pattern image captured by the capturing section; and a controller configured to, when two pages of the pattern image are read by the reader, predicting a capturing timing of each remaining unread page of the pattern image according to a capturing time interval between the first two pages of the pattern image and relevant page information of each of the first two pages of the pattern image;

generating a capturing timing table based on the calculation result;

capturing each remaining unread page of the pattern image according to the generated timing table; and correcting the predicted capturing timing in the table when each page of the pattern image has not been read in accordance with capturing timing in the table in the step of capturing and reading the remaining unread pages of the pattern image.

\* \* \* \* \*